United States Patent [19]

Kuipers

[11] Patent Number: 5,217,781
[45] Date of Patent: Jun. 8, 1993

[54] COMPUTER MOUSE PAD

[76] Inventor: Jurjen Kuipers, Da Costalaan 27, NL-3743 Ht Baarn, Netherlands

[21] Appl. No.: 918,783

[22] Filed: Jul. 27, 1992

Related U.S. Application Data

[63] Continuation of Ser. No. 365,824, Jun. 14, 1989, abandoned.

[51] Int. Cl.$^5$ .......................... B32B 3/02; B32B 3/26; B05D 1/14
[52] U.S. Cl. ...................... 428/85; 340/710; 428/90; 428/95; 428/96; 428/318.6; 428/319.3; 428/319.7
[58] Field of Search ............... 428/85, 90, 95, 96, 428/318.6, 319.3, 319.7; 340/710

[56] References Cited

U.S. PATENT DOCUMENTS

| | | | |
|---|---|---|---|
| 443,205 | 12/1890 | Galle | 40/358 |
| 1,180,750 | 5/1915 | Wolf | 40/374 |
| 1,379,134 | 5/1921 | Steddom | 40/490 |
| 1,465,244 | 8/1923 | Hager | 40/374 |
| 3,943,645 | 3/1976 | Viesturs | 40/159 |
| 4,197,151 | 4/1980 | Muzik | 40/615 |
| 4,363,071 | 12/1982 | Rzepecki et al. | 361/220 |
| 4,414,260 | 11/1983 | Rzepecki et al. | 428/212 |
| 4,439,757 | 3/1984 | Gross et al. | 40/611 |
| 4,456,800 | 6/1984 | Holland | 361/220 |
| 4,484,250 | 11/1984 | Rzepecki et al. | 361/220 |
| 4,594,586 | 6/1986 | Hosogoe | 74/471 X |
| 4,595,070 | 6/1986 | Hodges | 180/125 |
| 4,799,054 | 1/1989 | House | 340/706 |

FOREIGN PATENT DOCUMENTS 2197440 5/1988 United Kingdom .

OTHER PUBLICATIONS

PCT WO89/05734, House, V., Dean, "Work Surface Information Display Pad", Jun. 29, 1989, Priority date: Dec. 21, 1987.

Primary Examiner—William J. Van Balen
Assistant Examiner—Kathryne E. Shelborne
Attorney, Agent, or Firm—Wegner, Cantor, Mueller & Player

[57] ABSTRACT

Computer mouse pad or mat, composed of at least the following layers:

A) a non-static polyvinyl chloride upper layer having a thickness in the range of from 0.20 to 0.80 mm, the surface of said layer having a soft, suède-like structure;

B) a crease-resistant intermediate plastic layer that keeps its shape, has a thickness in the range of from 0.75 to 1.5 mm and after bending returns fast to the plane form;

C) a bottom layer functioning as an anti-slip layer in contact with a ground in the form a working-table-top, desk-top and the like and consisting of a foamed thermoplastic synthetic material, said bottom layer having a thickness in the range of from 0.5 to 2 mm.

9 Claims, No Drawings

COMPUTER MOUSE PAD

This application is a continuation of U.S. application Ser. No. 07/365,824 filed Jun. 14, 1989 is now abandoned.

The invention relates to a computer mouse pad or mat and more particularly to a pad or mat composed of layers.

A great number of such computer mouse pads of various materials have been proposed, consisting either of a flat layer of a crease-resistant kind of rubber that keeps its shape or of a composite layer, of which pad the bottom surface is an anti-slip layer.

A drawback of these pads was that on use of the computer pad the upper layer got a static charge or that the price of the used rubber was relatively high. Moreover the upper surface of most of the pads in use at present was dented.

It is an object of the invention to provide a cheaper computer mouse pad with better use characteristics.

It was surprisingly found that this object could be achieved by the mouse pad being composed of at least the following layers:

A) a non-static polyvinylchloride upper layer having a thickness in the range of from 0.20 to 0.80 mm, preferably from 0.30 to 0.60 mm, the surface of said layer having a soft suède-like structure;

(The soft, suède-like structure can be obtained by flocking a thermoplastic anti-static fibre not consisting of polyvinylchloride onto a polyvinylchloride base sheet containing a plasticizer. The base sheet preferably consists of polyvinylchloride, plasticizer and the usual stabilizers, pigments, auxiliaries, and the flocked fibre consists of a different plastic such as for example polypropylene.)

B) a crease-resistant plastic layer that keeps its shape, preferably consisting of a sheet or plate of polyvinylchloride or propylene containing a plasticizer and having a thickness in the range of from 0.75 to 1.50 mm, preferably from 0.85 to 1.20 mm, said layer returning fast to the plane form after bending;

C) a bottom layer functioning as an anti-slip layer in contact with the ground in the form of a working-table-top, desk-top and the like and consisting of foamed thermoplastic synthetic material.

As bottom layer preferably a soft thermoplastic polyvinylchloride foam layer is used having a thickness in the range of from 0.5-2 mm.

The computer mouse pad thus composed can be prepared in a simple way by a variety of known methods, e.g. by welding together the above-mentioned layers A, B and C at the periphery of the mouse pad by means of fast local high frequency heating while pressing. Preferably the welding is performed in a single integrated operation including also the cutting and punching of the required area of the pad.

According to an alternative method the layers can be combined e.g. by gluing, sticking or luting, followed by cutting or punching, preferably in a single operation.

Welding together of the layers along the periphery of the pad combined with punching or cutting of the pad in a single operation is preferred.

Use of a polyvinylchloride sheet of the type such as Draka Polva Tudor ® (a product of Draka Polva B.V., Amsterdam, The Netherlands) as the layer A) is particularly preferred.

Use of a laminated polyvinylchloride sheet or plate containing plasticizer and having a thickness of 0.75-1.5 mm and being composed of two or more sheets consisting of polyvinylchloride, plasticizer, pigments and the usual auxiliaries is particularly preferred as the layer B).

It will be clear that the computer mouse pad according to the invention can also be obtained by starting from commercially available systems of two layers of plastic materials consisting of two of said three plastic layers. More particularly the use of a system of two layers already attached to each other and composed of the layers B) and C) mentioned hereinbefore is most preferred. Such a two-layer system forming the layers B and C is exemplified by the commercial product Draka Polva Xousmain ® (a product of Draka Polva B.V., Amsterdam, The Netherlands). Such systems have been built up from a laminated polyvinylchloride sheet or plate containing plasticizer, consisting of two or more sheets glued together and each consisting of polyvinylchloride, plasticizer, pigments and the usual auxiliaries, onto which a layer of thermoplastic foam has been fastened.

The dimensions of the computer mouse pad according to the invention can in principle be varied dependent on the specific use. Preferably the mouse pad has the form of a rectangle with a length of 20–50 cm and a breadth of 15–35 cm and more preferably with a length of 25–30 cm and a breadth of 20–25 cm.

The advantages of the computer mouse pad according to the invention are formed by the use of cheap, commercially readily available plastic materials which moreover on use of the computer mouse give to the pad a properly sufficient harshness and firmness without shifting over the table-top or building up static electricity, even not on prolonged use. Moreover the pad is lying permanently flat.

The invention is illustrated in detail by the following example, however without restricting the invention to this specific embodiment.

EXAMPLE

A computer mouse pad of 28×22 cm was made by welding together and cutting out a system of sheets consisting of (1) a plasticized polyvinylchloride sheet (layer A) having a thickness of 0.28 mm and consisting of polyvinylchloride, plasticizer, the usual stabilizers for this plastic, pigments and auxiliary materials, onto which sheet a thermoplastic, anti-static fibre not consisting of polyvinylchloride has been flocked (make: Draka Polva Tudor ® sheet):

(2) a laminated polyvinylchloride sheet (layers B and C) containing plasticizer and consisting of two layers of polyvinylchloride sheet containing plasticizer, pigments and the usual auxiliary materials and onto which a thermoplastic foam has been glued (Draka Polva Xousmain ®).

The computer mouse pad thus obtained did not show after prolonged use (>10 hours) any static charge and retained the form of a flat plate.

I claim:

1. A computer mouse pad made of a laminate consisting of three discrete layers, an upper layer, an intermediate layer, and a bottom layer:
   (A) said upper layer being made of a non-static polyvinylchloride and having a thickness in the range of from 0.20 to 0.80 mm and a soft, suede-like top surface;

(B) said intermediate layer being made of a crease-resistant plastic and having a thickness in the range of from 0.75 to 1.5 mm, which keeps its shape and after bending returns fast to planar form; and (C) said bottom layer being an anti-slip layer made of a foamed thermoplastic synthetic material having a thickness in the range of from 0.5 to 2 mm.

2. A computer mouse pad according to claim 1, wherein said top surface comprises anti-static fiber of a thermoplastic other than polyvinylchloride flocked onto a polyvinylchloride based sheet containing a plasticizer.

3. A computer mouse pad according to claim 2, wherein said thermoplastic is polypropylene.

4. A computer mouse pad according to claim 1, wherein said upper layer contains polyvinylchloride, plasticizer, a stabilizer and a pigment.

5. A computer mouse pad according to claim 1, wherein said upper layer, said intermediate layer and said bottom layer are welded together along the pad periphery which has been cut or punched out.

6. A computer mouse pad according to claim 1, wherein the thickness of said upper layer is in the range of from 0.30 to 0.60 mm, and the thickness of said intermediate layer is in the range of from 0.85 to 1.2 mm.

7. A computer mouse pad according to claim 1, wherein said intermediate layer comprises two laminated sheets each containing polyvinylchloride, plasticizer and a pigment.

8. A computer mouse pad according to claim 1, wherein the pad is rectangular and has a length of 20 to 50 cm and a breadth of 15 to 35 cm.

9. A computer mouse pad according to claim 8, wherein the length is 25 to 30 cm and the breadth is 20 to 25 cm.

* * * * *